(12) United States Patent
Claessens et al.

(10) Patent No.: US 9,857,547 B2
(45) Date of Patent: Jan. 2, 2018

(54) FIBER TRAY ORGANIZER SYSTEMS AND METHODS

(71) Applicant: CommScope Connectivity Belgium BVBA, Kessel-Lo (BE)

(72) Inventors: Bart Mattie Claessens, Hasselt (BE); Dirk Kempeneers, Aarschot (BE); Wouter Foulon, Leuven (BE); Vince Wellens, Diest (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 14/360,196

(22) PCT Filed: Nov. 12, 2012

(86) PCT No.: PCT/EP2012/072415
§ 371 (c)(1),
(2) Date: May 22, 2014

(87) PCT Pub. No.: WO2013/075966
PCT Pub. Date: May 30, 2013

(65) Prior Publication Data
US 2014/0321825 A1    Oct. 30, 2014

Related U.S. Application Data

(60) Provisional application No. 61/562,821, filed on Nov. 22, 2011.

(51) Int. Cl.
*G02B 6/00* (2006.01)
*G02B 6/44* (2006.01)

(52) U.S. Cl.
CPC ........... *G02B 6/444* (2013.01); *G02B 6/4455* (2013.01)

(58) Field of Classification Search
CPC .. G02B 6/4452; G02B 6/3897; G02B 6/4471; G02B 6/4453; G02B 6/4454
(Continued)

(56) References Cited

U.S. PATENT DOCUMENTS 5,363,466 A    11/1994    Milanowski et al.
5,835,657 A    11/1998    Suarez et al.
(Continued)

FOREIGN PATENT DOCUMENTS

CN    201993487 U    9/2011
DE    10 2010 006 611    8/2011
(Continued)

OTHER PUBLICATIONS

International Search Report for International Application No. PCT/EP2012/072415 dated Mar. 7, 2013 (2 pages).
(Continued)

*Primary Examiner* — Jennifer Doan
(74) *Attorney, Agent, or Firm* — Merchant & Gould P.C.

(57) ABSTRACT

A self supporting apparatus (10) for trays (40) includes a groove plate (20), and a plurality of pivotally mounted trays (40) wherein each tray (40) is pivotally moveable relative to the groove plate (20) between a first position (46) and a second position (48). The groove plate (20) includes a plurality of flexible tabs (70) facing the plurality of trays (40). An edge (50) of each tray (40) includes a rounded surface (52) and a rib (56), wherein each one of the ribs (56) engages one of the flexible tabs (70) to hold the trays (40) in one of the first or second positions (46, 48). The rib (56) flexes the tab (70) as each tray (40) is pivoted between the first and second positions. The tab (70) and rib (56) maintain the trays (40) in the selected positions until the trays (40) are moved.

26 Claims, 12 Drawing Sheets

(58) Field of Classification Search
USPC .................................. 385/134, 135, 136, 137
See application file for complete search history.

(56) References Cited

U.S. PATENT DOCUMENTS

| | | | |
|---|---|---|---|
| 5,917,984 | A | 6/1999 | Roseler et al. |
| 6,193,651 | B1* | 2/2001 | DeFonzo ..................... 600/201 |
| 6,275,641 | B1 | 8/2001 | Daoud |
| 6,304,707 | B1 | 10/2001 | Daems et al. |
| 6,438,310 | B1 | 8/2002 | Lance et al. |
| 6,856,747 | B2 | 2/2005 | Cloud et al. |
| 7,970,249 | B2* | 6/2011 | Solheid |
| 8,934,750 | B2 | 1/2015 | Benedetto et al. |
| 2006/0008230 | A1 | 1/2006 | Giordano et al. |
| 2013/0133525 | A1* | 5/2013 | Blanc et al. ................. 99/302 R |

FOREIGN PATENT DOCUMENTS

| | | |
|---|---|---|
| EP | 0 823 650 | 2/1998 |
| EP | 1 870 750 | 12/2007 |
| JP | 8-508348 A | 9/1996 |
| WO | WO 89/05989 | 6/1989 |
| WO | WO 94/23324 | 10/1994 |
| WO | WO 95/07480 | 3/1995 |
| WO | WO 00/48032 | 8/2000 |
| WO | 2009102912 A1 | 8/2009 |
| WO | 2009106874 A1 | 9/2009 |

OTHER PUBLICATIONS

OPTOTEC Optical Technologies—NTET Group "Optical Distribution Closure Focus-ODC" dated Jan. 20, 2009 (28 pages).

OPTOTEC Optical Technologies products that include rotatable trays with square shaped (4-sided) hinge pins, "Optical Distribution Closure Focus-ODC," O.IO.IA.0008-01, Jan. 20, 2009, 28 pgs. (Admitted prior art as of Nov. 11, 2011.).

Photographs of OPTOTEC Optical Technologies products, 34 pgs. (Admitted prior art as of Nov. 11, 2011.).

\* cited by examiner

FIBER TRAY ORGANIZER SYSTEMS AND METHODS

This application is a National Stage Application of PCT/EP2012/072415, filed 12 Nov. 2012, which claims benefit of U.S. Provisional Ser. No. 61/562,821, filed 22 Nov. 2011 and which applications are incorporated herein by reference. To the extent appropriate, a claim of priority is made to each of the above disclosed applications.

TECHNICAL FIELD

The present disclosure relates to telecommunications organizers including trays for fiber optic cables.

BACKGROUND OF THE INVENTION

Fiber optic cables are often managed with an optical fiber organizer including a plurality of pivotally mounted trays mounted on a support. There is a need from time to time to access an individual tray to add a fiber, remove a fiber, or make adjustments to the fiber on the tray. There is a need for devices and methods which allow the trays to pivot to access a specific tray. Extra structure separate from the organizer and added to the organizer to hold the trays in selected positions, such as a wire, is not preferred for holding the trays, as the wire could get misplaced.

SUMMARY OF THE INVENTION

A fiber tray apparatus includes a groove plate and a plurality of trays pivotally mounted to the groove plate in a stacked arrangement. Each tray is pivotally moveable relative to the groove plate between a first position and a second position. The groove plate includes a plurality of flexible tabs which face the plurality of trays. An edge of each tray includes a rounded surface and a projecting rib. Each one of the ribs engages one of the flexible tabs to hold the trays in one of the first or second positioned positions. The rib flexes the tab as each tray is pivoted between the first and second positions.

One aspect of the invention includes providing the edge of each tray with two rounded surfaces and a rib on each rounded surface, and wherein the groove plate includes two flexible tabs for each tray.

In a further aspect, each rounded surface of each edge has a convexly rounded profile, and the tabs each have a concavely rounded profile for receiving the convexly rounded profile of the respective edges.

In a still further aspect, each tab positioned adjacent to each tray extends generally parallel to a direction of extension of the edge of each tray.

In a preferred embodiment, the trays are positioned on a first side of the groove plate, and the tab or tabs are positioned adjacent to each tray and flex away from the first side toward an opposite side of the groove plate.

A further aspect of the present invention relates to a method of using a fiber tray apparatus including providing a groove plate and a plurality of pivotally mounted trays wherein the groove plate includes a plurality of flexible tabs facing the plurality of trays, and an edge of each tray includes a rounded surface and a rib. Each one of the ribs engages one of the flexible tabs to hold the trays in one of a first or second position. The rib flexes the tab as each tray is pivoted between the first and second positions. The rib includes a first edge which maintains the tray in one of the pivoted positions, and a second edge for maintaining the tray in the other pivoted position.

In one aspect of the invention, the groove plate includes a single pivoting tray.

In a further aspect of the invention, a groove plate is provided for use with a plurality of pivoting fiber trays wherein the groove plate includes a plurality of flexible tabs for engagement with a rib on each pivoting tray.

A further aspect of the invention relates to a fiber tray including an edge with a rounded edge surface and a rib, wherein the rib engages a flexible tab of a groove plate to maintain the tray in a selected position.

One preferred orientation of the groove is vertically, wherein the trays hang at an angle downwardly in the first positions, and pivot upwardly at an angle to the second positions.

DETAILED DESCRIPTION

Figure 1:
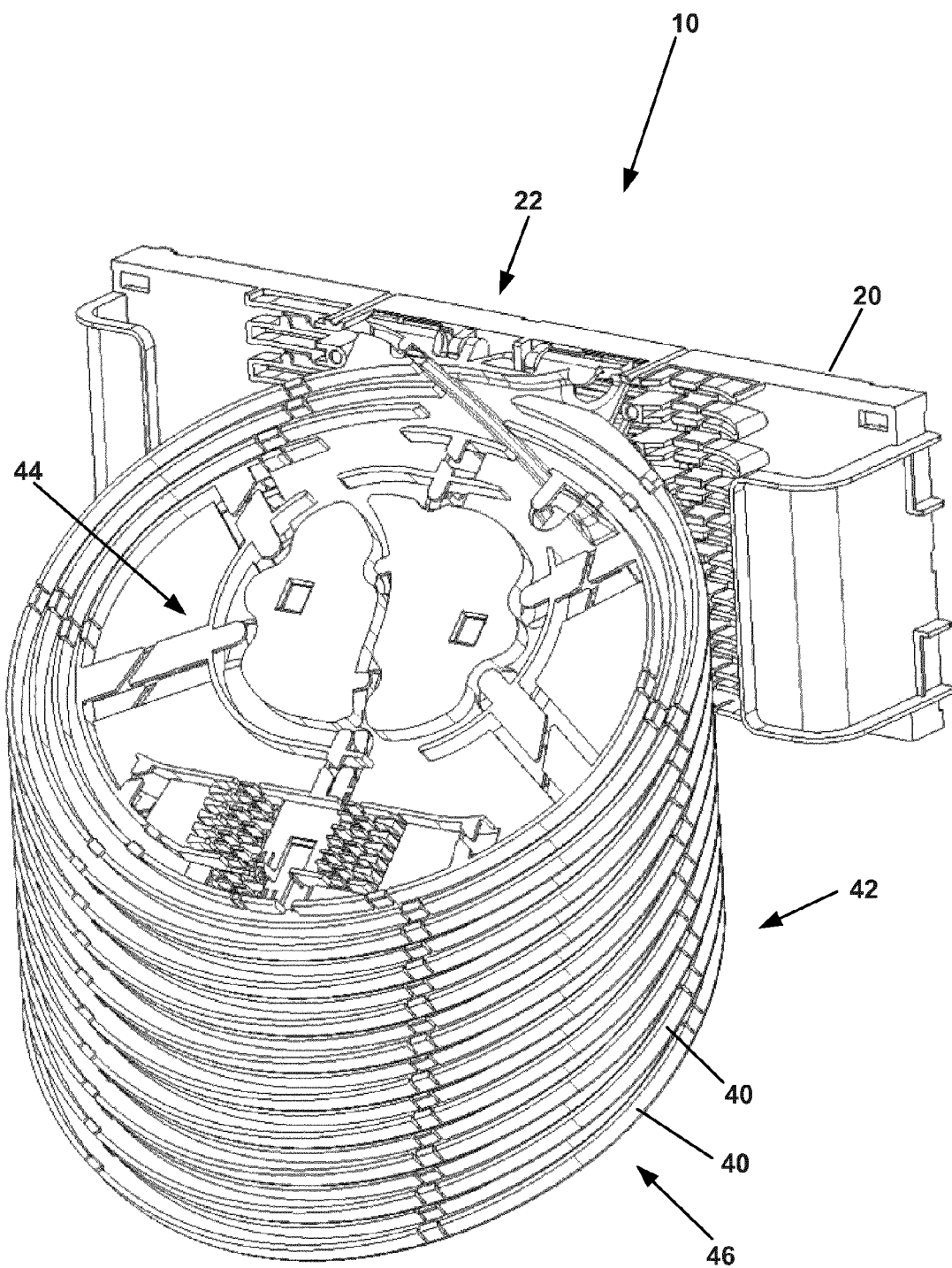
FIG. 1 is a perspective view of a fiber organizer apparatus including a groove plate and a stack of pivoting trays.

FIG. 1 is a perspective view of a first embodiment of a fiber tray apparatus or fiber tray organizer or apparatus 10 with pivotally mounted trays 40 mounted to a support or groove plate 20. Mounting structure 22 defines a hinge arrangement between trays 40 and groove plate 20.

Groove plate 20 includes loops 24 on a front 26. A back 28 faces in an opposite direction. On front 26 is a flange 30. Each tray 40 is pivotally mounted to groove plate 20 to individually move and allow selected access for a desired tray 40.

Figure 2:
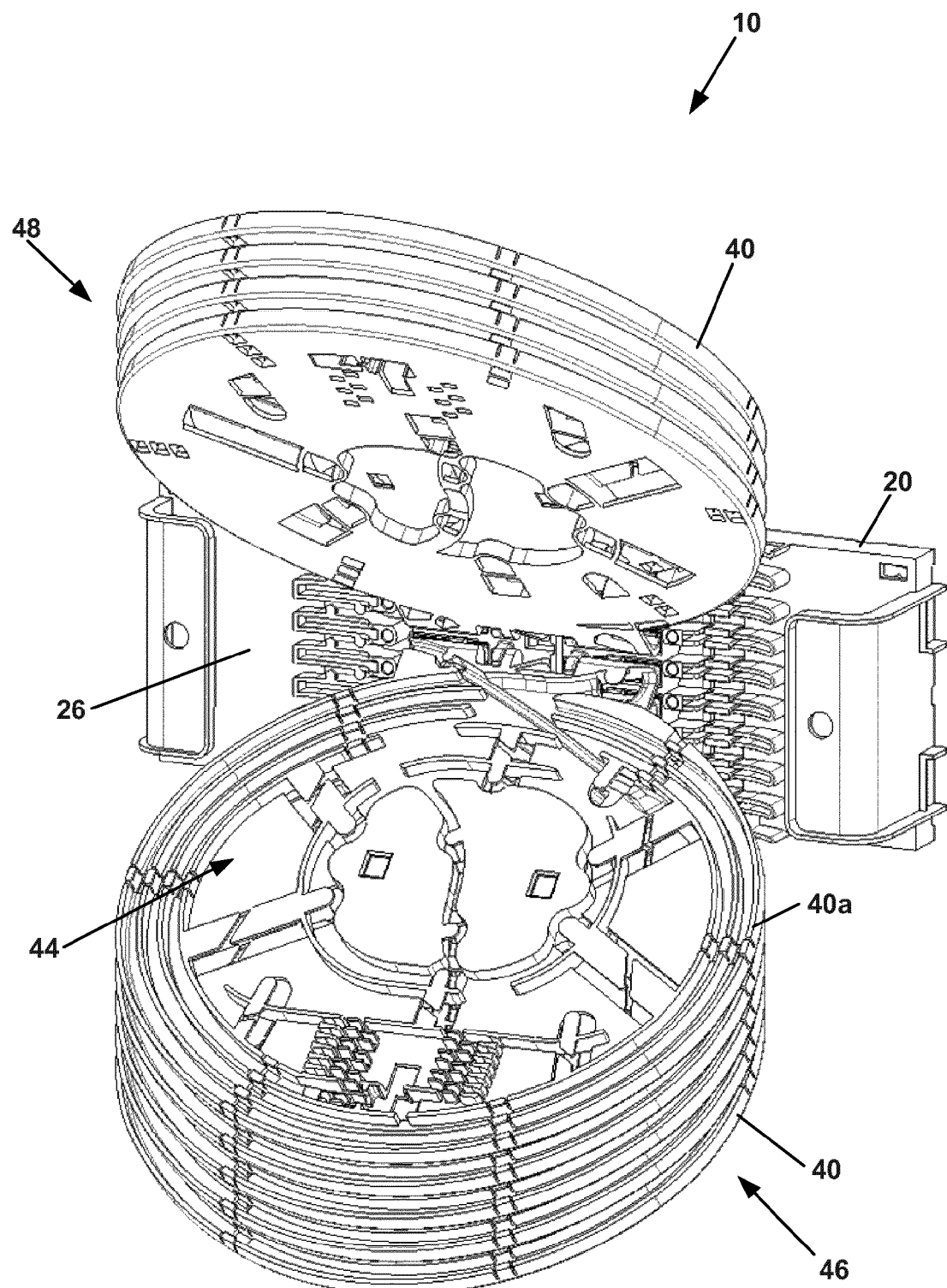
FIG. 2 shows the stack of pivoting trays wherein a selected group of trays is pivoted to a second position to allow access to a selected tray within the stack.
Figure 3:
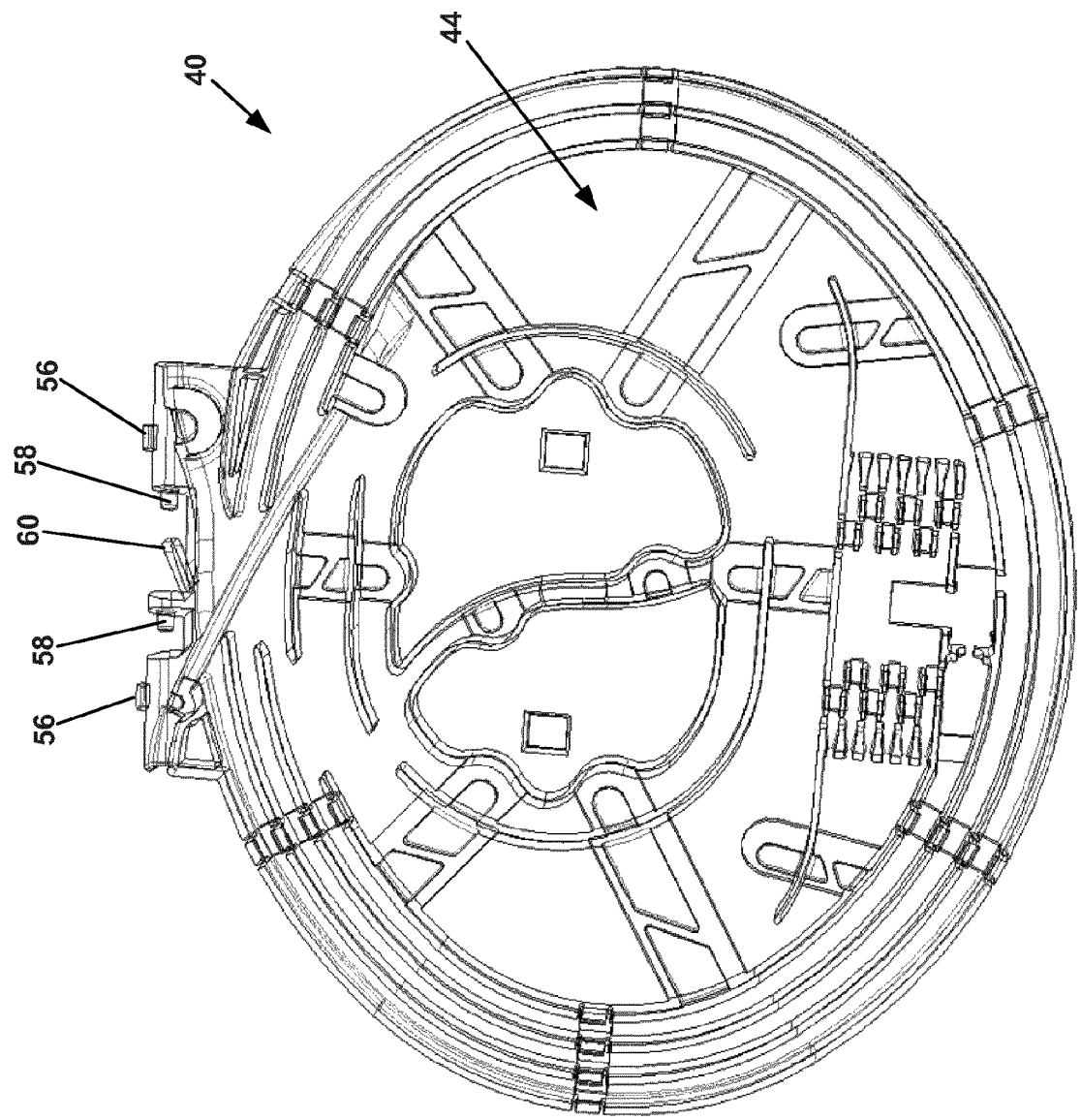
FIG. 3 is a top view of a tray.
Figure 4:
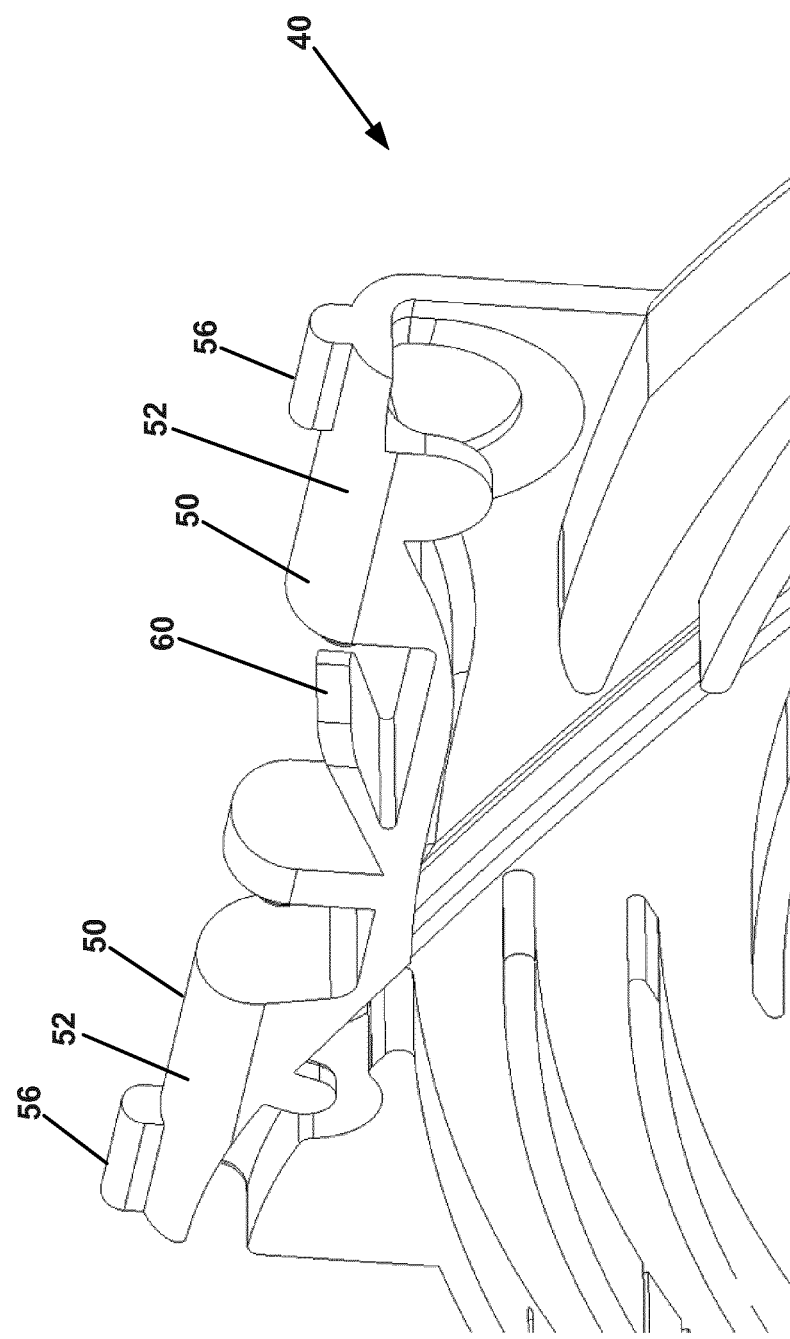
FIG. 4 is a perspective view of an edge portion of the tray.
Figure 5:
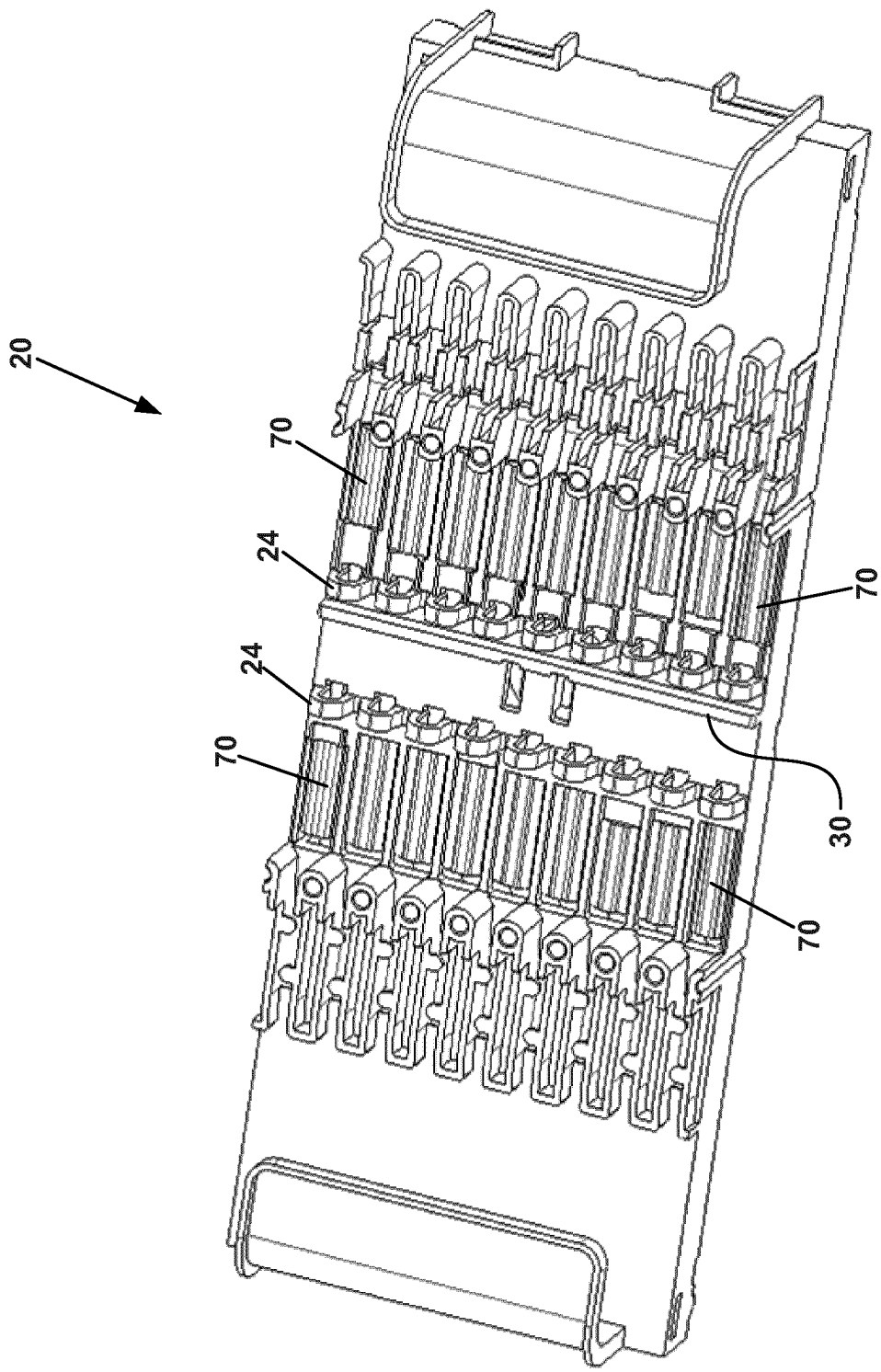
FIG. 5 is a perspective view of the groove plate.
Figure 6:
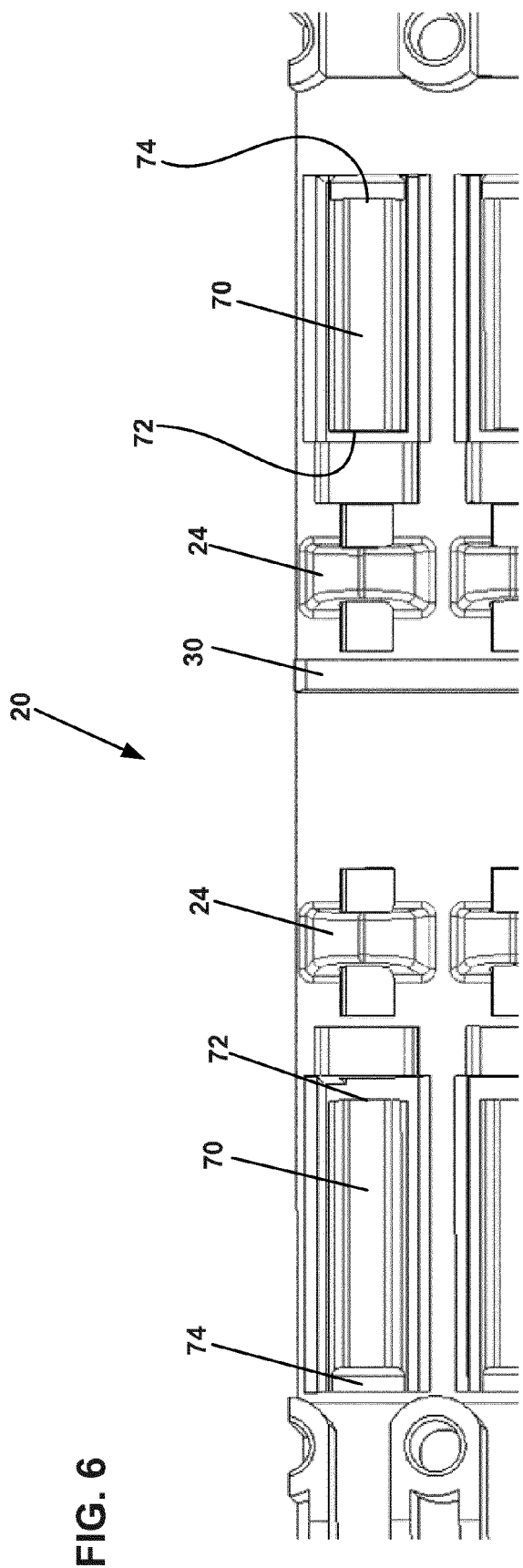
FIG. 6 is a top view of a portion of the groove plate.
Figure 7:
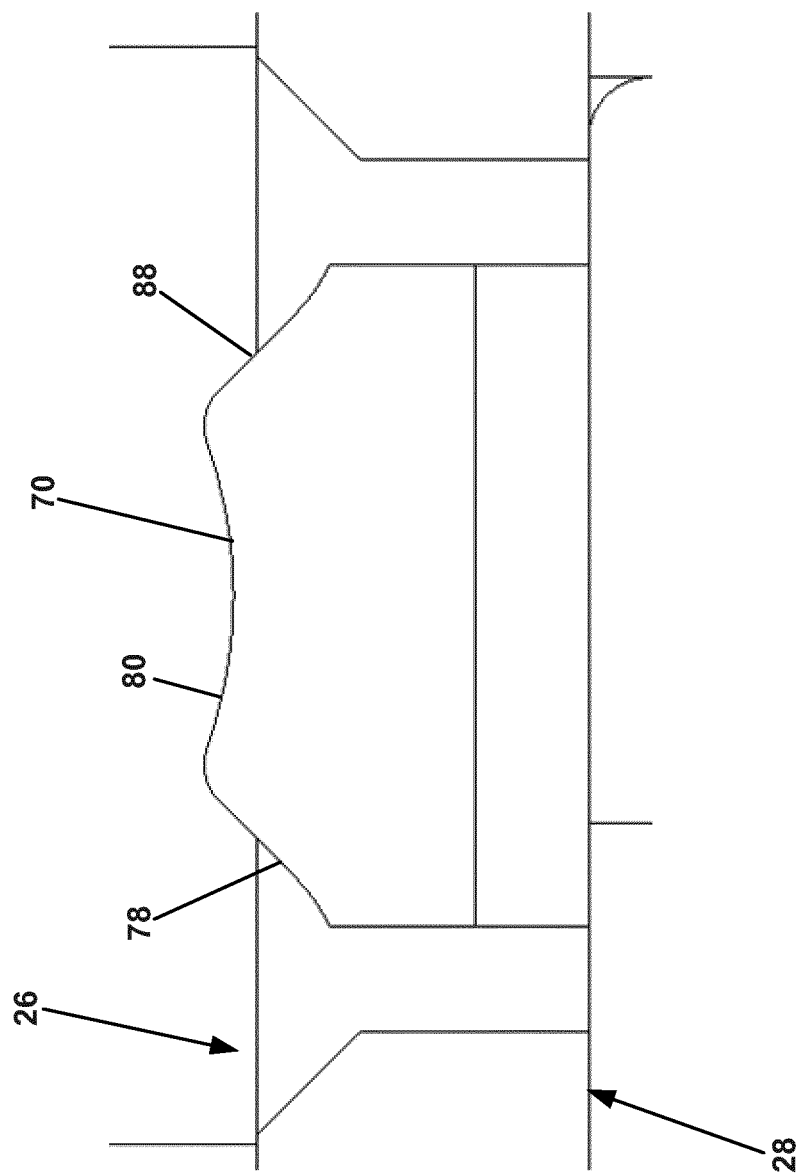
FIG. 7 is a cross-sectional view of the groove plate showing one of the flexible tabs.

FIG. 2 shows four trays pivoted from a first position 46 to a second position 48 to allow access to tray 40a.

Each tray 40 includes one or more fiber management features 44, such as splice holders, radius limiters, slack storage, or fiber retention tabs.

Each tray 40 includes an edge 50 which includes a convexly rounded surface 52. As illustrated, each tray includes two portions 50 each having a rounded surface 52. Each tray 40 includes at least one rib 56 which projects outwardly from rounded surface 52. In the preferred embodiment, each tray 40 includes two ribs 56.

To allow pivoting movement, each tray 40 includes two posts 58, and a flexible finger 60. Posts 58 are received in loops 24, and finger 60 engages flange 30 to retain the trays 40 with groove plate 20.

Groove plate 20 includes a plurality of tabs 70 which flex away from front 26 toward back 28 of groove plate 20. In the preferred embodiment, two tabs 70 are provided for each tray. Each tab 70 includes a fixed end 74 and a distal free end 72 to permit flexing. Tab 70 includes curved middle surface 76 with a profile that extends longitudinally, a first edge 78 that extends longitudinally and an opposite edge 88 that extends longitudinally.

Figure 8:
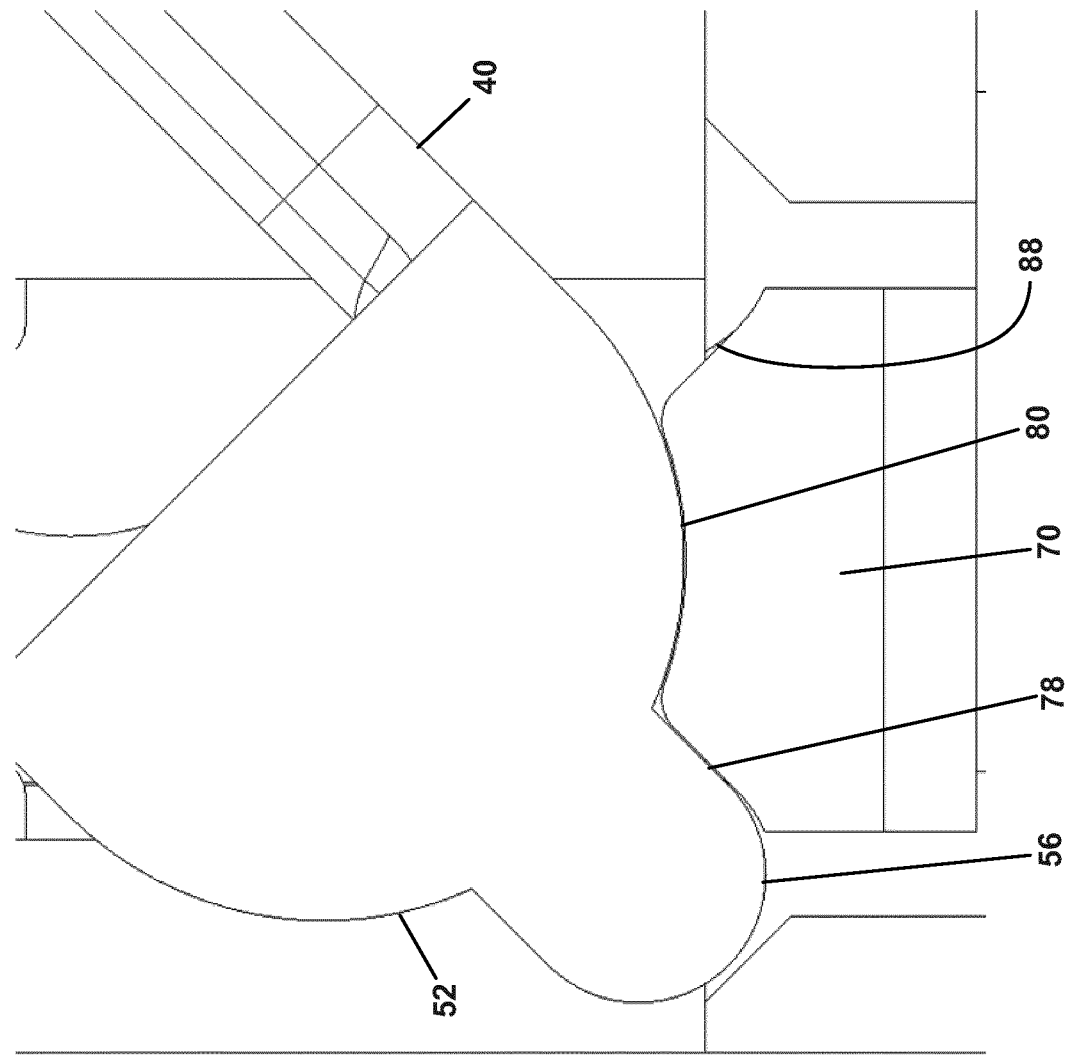
FIG. 8 is a view similar to FIG. 7 and showing a tray in a first position relative to the flexible tab.
Figure 9:
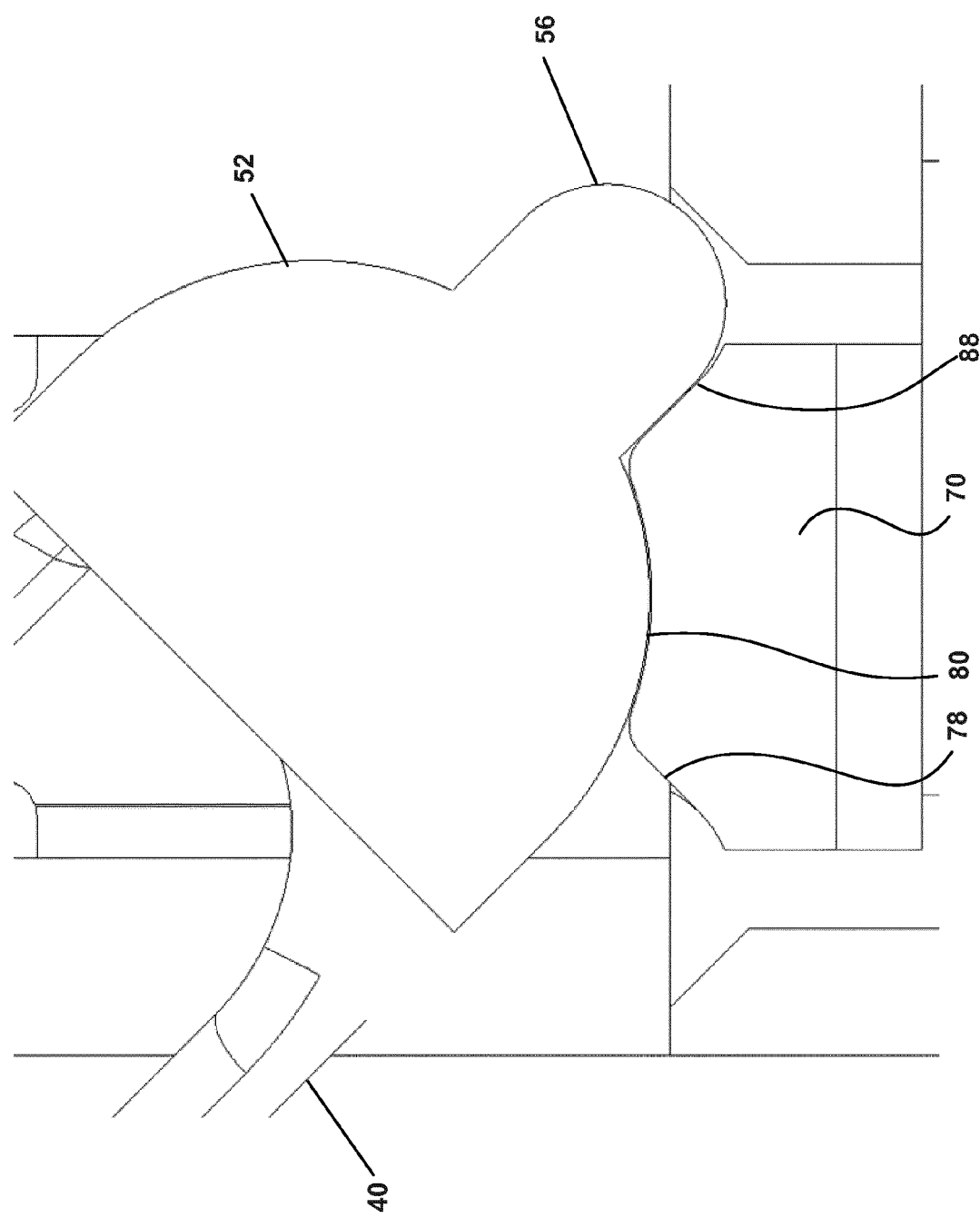
FIG. 9 is a view similar to FIG. 8 with the tray pivoted to the opposite second position.
Figure 10:
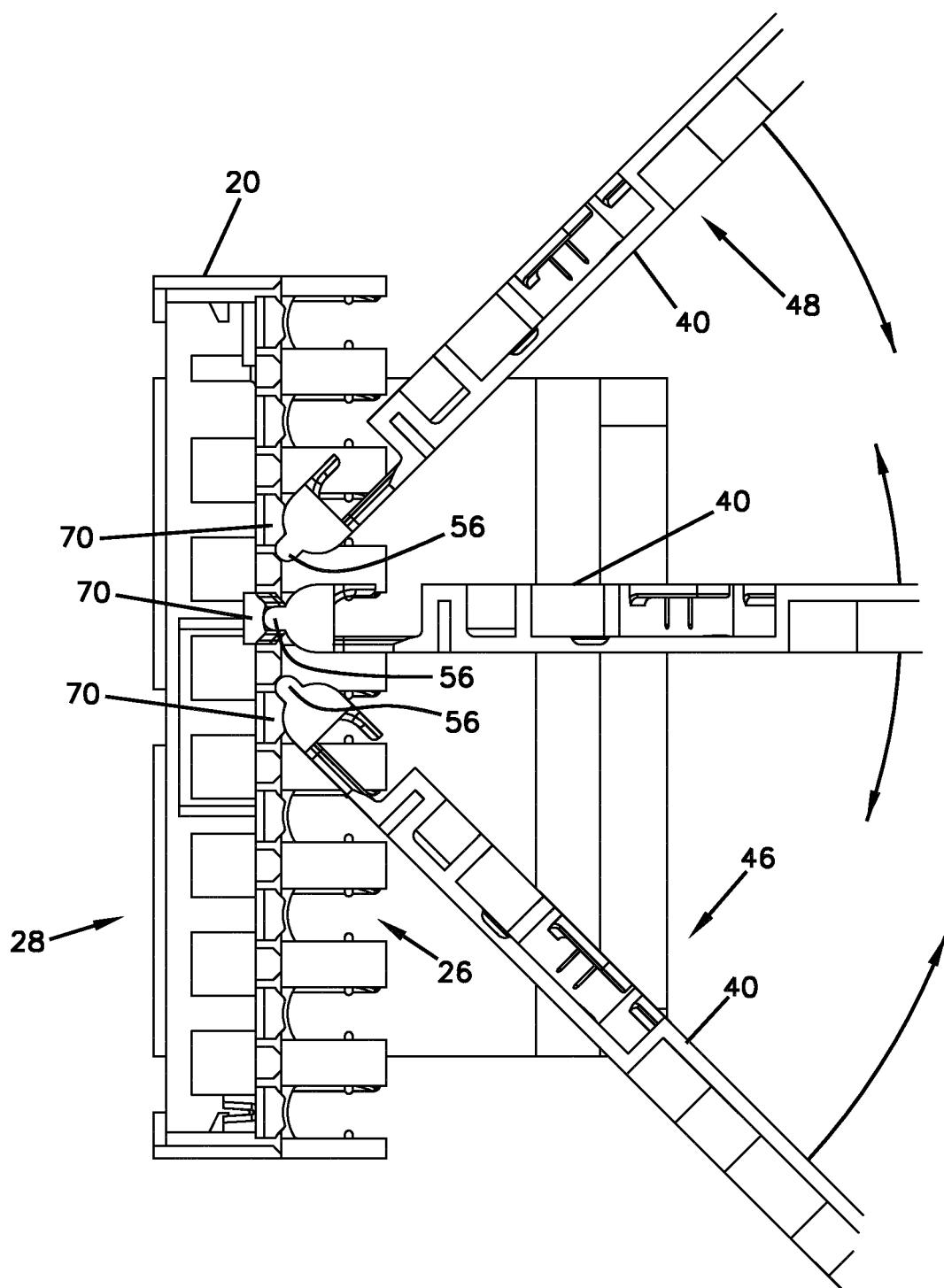
FIG. 10 shows three trays mounted to the groove plate wherein the upper tray is in a first pivoted position, the lower tray is in a second pivoted position, and the middle tray is in an intermediate position being moved between the first and second positions.
Figure 11:
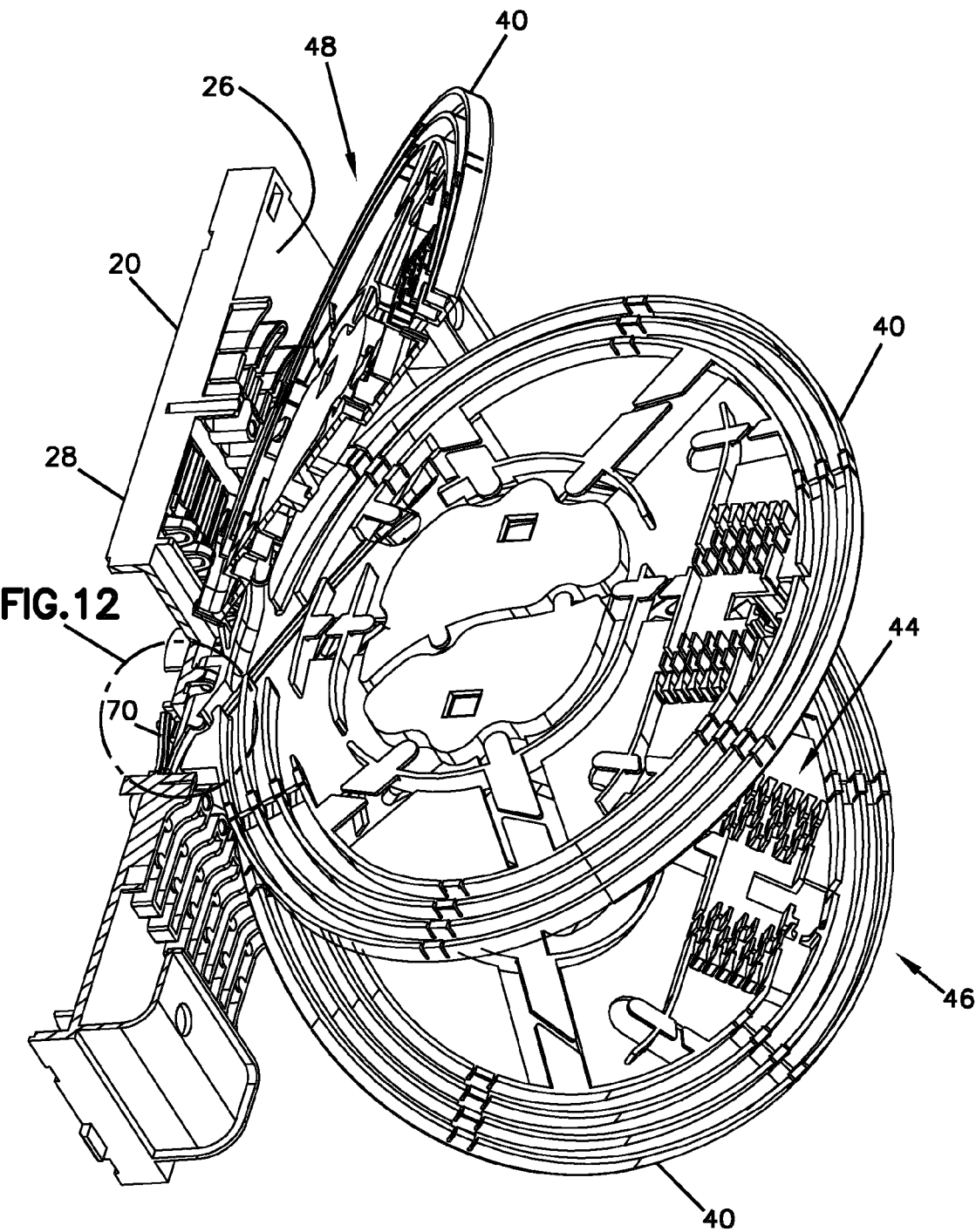
FIG. 11 is a perspective view of the arrangement shown in FIG. 10 in partial cross-section.
Figure 12:
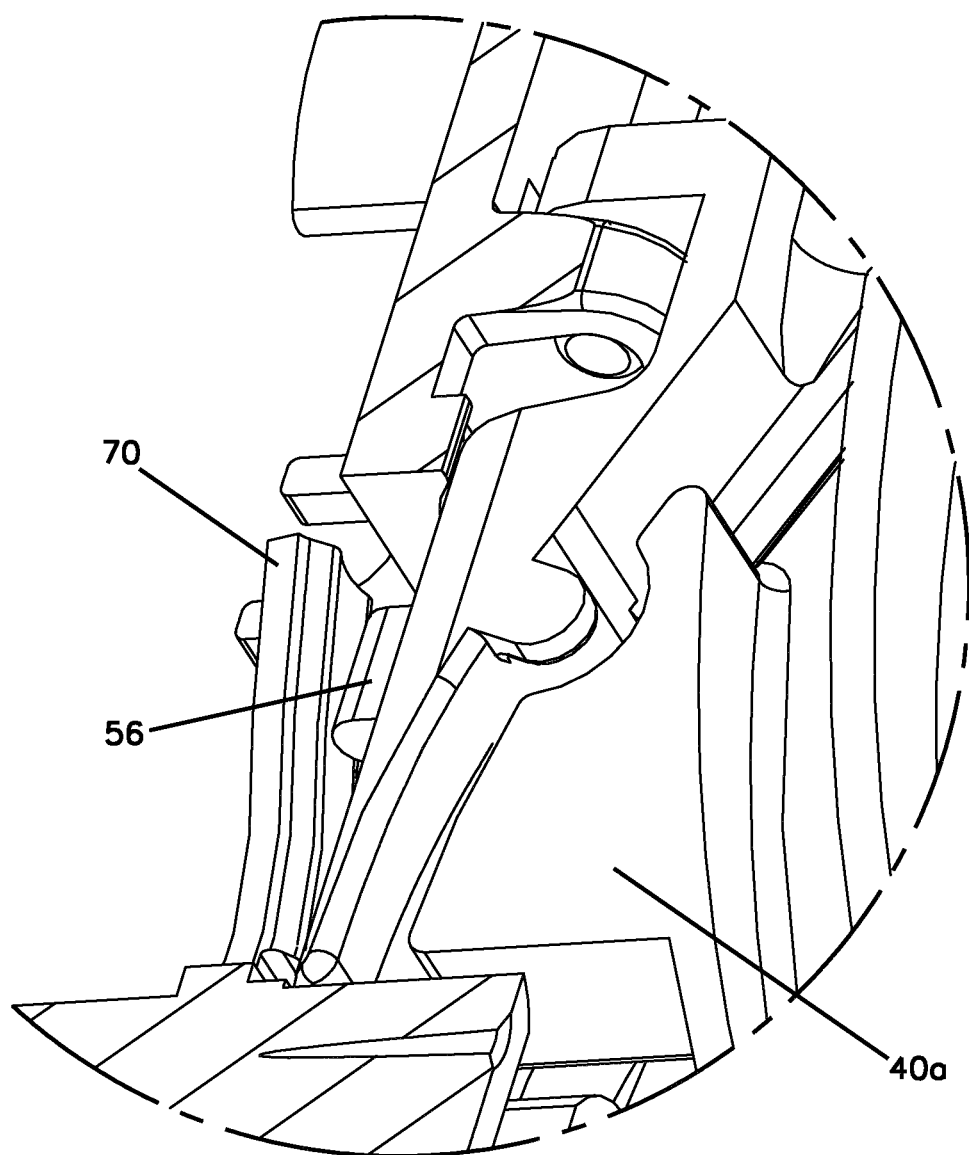
FIG. 12 is an enlarged view of a portion of FIG. 11.

As shown in FIGS. 8 and 9, rib 56 maintains tray 40 in the selected pivoted position by engagement of tab 56 with first edge 78 or opposite edge 88. To pivot tray 40 between positions, a user pushes one or more trays in the opposite direction, and rib 56 pushes tab 70 toward back 28 to allow switching of positions. FIG. 10 shows three trays 40 and the middle tray 40a is shown with the rib 56 flexing the tab outwardly. FIGS. 11 and 12 further show the flexing of tab 70 to allow movement of the trays 40 between positions.

With the above-described and method, a self supporting tray organizer is provided wherein the trays (40) remain in the desired position to allow access to a selected tray 40 disposed in the stack 42. No additional hardware separate from the organizer is needed to hold the trays 40 in the desired positions.

PARTS LIST

10 Apparatus
20 Groove plate (support)
22 Mounting structure
24 Loops
26 Front
28 Back
30 Flange
40 Trays
40a Selected tray
42 Stack
44 Fiber management feature
46 First position
48 Second position
50 Edge of tray
52 Rounded surface
56 Rib
58 Post
60 Finger
70 Tab
72 Distal end
74 Fixed end
78 First edge
80 Concave profile
88 Opposite edge

The invention claimed is:

1. A fiber tray apparatus comprising:
a groove plate;
a plurality of trays, the plurality of trays pivotally mounted to the groove plate in a stacked arrangement, each tray pivotally movable relative to the groove plate between a first position and a second position;
wherein the groove plate includes a plurality of flexible tabs facing the plurality of trays;
wherein an edge of each tray includes rounded surface and a rib;
wherein each one of the ribs engages one of the flexible tabs to hold the trays in one of the first or second positions, and wherein the tabs each have a profile for receiving the rounded surfaces of the respective edge of each tray; and
wherein the rib flexes the tab as each tray is pivoted between the first and second positions.

2. The apparatus of claim 1, wherein the edge of each tray includes two rounded surfaces and two ribs, and wherein the groove plate includes two flexible tabs for each tray.

3. The apparatus of claim 1, wherein the rounded surfaces of the edges each have a convexly rounded profile, and wherein the tabs each have a concavely rounded profile for receiving the convexly rounded profile of the respective edge.

4. The apparatus of claim 1, wherein the tab positioned adjacent to each tray extends parallel to a direction of extension of the edge of each respective tray.

5. The apparatus of claim 1, wherein the trays are positioned on a first side of the groove plate, and wherein the tab positioned adjacent to each tray flexes away from the first side toward an opposite side of the groove plate.

6. A method of using a fiber tray apparatus comprising:
providing a groove plate;
providing a plurality of trays, the plurality of trays each having a cable management feature, the plurality of trays pivotally mounted to the groove plate in a stacked arrangement, each tray pivotally movable relative to the groove plate between a first position and a second position;
providing the groove plate with a plurality of flexible tabs facing the plurality of trays;
wherein an edge of each tray includes a rounded surface and a rib, each one of the ribs engages one of the flexible tabs to hold the trays in one of the first or second positions and wherein the flexible tabs each have a profile for receiving the rounded surfaces of the respective edge of each tray; and
wherein the rib flexes the tab as each tray is pivoted between the first and second positions; and
pivoting at least one tray, wherein the rib flexes the tab as the at least one tray is pivoted between the first and second positions, wherein the tab holds the at least one tray in the second position.

7. The method of claim 6, wherein the rib engages a first edge of the tab when the at least one tray is in the second position.

8. The method of claim 6, wherein the rib engages a second edge of the tab when the at least one tray is in the first position.

9. A fiber tray apparatus comprising:
a groove plate;
a tray, pivotally mounted to the groove plate, movable relative to the groove plate between a first position and a second position;
wherein:
the groove plate includes a flexible tab facing the tray; and
an edge of the tray includes a rounded surface and a rib;
wherein the rib engages the flexible tab to hold the tray in one of the first or second positions; and
wherein the rib flexes the tab as the tray is pivoted between the first and second positions, and wherein the tab has a profile for receiving the rounded surface of the edge of the tray.

10. The apparatus of claim 9, wherein the edge of the tray includes two rounded surfaces and two ribs, and wherein the groove plate includes two flexible tabs.

11. The apparatus of claim 9, wherein the edge has a convexly rounded profile, and wherein the tab has a concavely rounded profile for receiving the convexly rounded profile of the edge.

12. The apparatus of claim 9, wherein the tab extends parallel to a direction of extension of the edge of the tray.

13. The apparatus of claim 9, wherein the tray is positioned on a first side of the groove plate, and wherein the tab flexes away from the first side toward an opposite side of the groove plate.

14. A method of using a fiber tray apparatus comprising:
providing a groove plate;
providing a tray pivotally mounted to the groove plate between a first position and a second position;
providing the groove plate with a flexible tab facing the tray;
wherein an edge of the tray includes a rounded surface and a rib, the rib engaged with the flexible tab to hold the tray in one of the first or second positions and wherein the flexible tab has a profile for receiving the rounded surface of the edge of the tray;
wherein the rib flexes the tab as the tray is pivoted between the first and second positions; and
pivoting the tray, wherein the rib flexes the tab as the tray is pivoted between the first and second positions, wherein the tab holds the tray in the second position.

15. The method of claim 14, wherein the rib engages a first edge of the tab when the tray is in the second position.

16. The method of claim 14, wherein the rib engages a second edge of the tab when the tray is in the first position.

17. A fiber tray apparatus comprising:
a groove plate for pivotally mounting to a plurality of fiber trays;
wherein the groove plate includes a plurality of flexible tabs facing the plurality of trays wherein the tabs each have a concavely rounded profile;
wherein an edge of each tray includes a rib having a rounded profile;
wherein each one of the ribs engages one of the flexible tabs to hold the trays in one of the first or second positions; and
wherein the rib flexes the tab relative to a remainder of the groove plate as each tray is pivoted between the first and second positions.

18. The apparatus of claim 17, wherein the groove plate includes two flexible tabs for each tray.

19. The apparatus of claim 17, wherein the tabs each have a concavely rounded profile for receiving a convexly rounded profile of the trays.

20. The apparatus of claim 17, wherein the tab positioned adjacent to each tray extend parallel to a direction of extension of the edge of each respective tray.

21. The apparatus of claim 17, wherein the trays are positioned on a first side of the groove plate, and wherein the tab positioned adjacent to each tray flexes away from the first side toward an opposite side of the groove plate.

22. A fiber tray apparatus comprising:
a tray, the tray having a cable management feature, the tray pivotally mountable to a groove plate, and the tray pivotally movable relative to the groove plate between a first position and a second position;
wherein an edge of the tray includes rounded surface and a rib having a rounded profile;
wherein the rib engages a flexible tab of the groove plate to hold the tray in one of the first or second positions, the flexible tab having a rounded profile for receiving the edge of the tray; and
wherein the rib flexes the tab as the tray is pivoted between the first and second positions.

23. The apparatus of claim 22, wherein the edge of the tray includes two rounded surfaces and two ribs, and wherein the groove plate includes two flexible tabs.

24. The apparatus of claim 22, wherein the edge has a convexly rounded profile, and wherein the tab has a concavely rounded profile for receiving the convexly rounded profile of the edge.

25. A fiber tray apparatus comprising:
a groove plate;
a plurality of trays, the plurality of trays pivotally mounted to the groove plate in a stacked arrangement, each tray pivotally movable relative to the groove plate between a first position and a second position, the first position in an opposite location to the second position relative to the groove plate;
wherein the groove plate includes a plurality of flexible tabs facing the plurality of trays;
wherein an edge of each tray includes a rounded surface and a rib;
wherein each one of the ribs engages one of the flexible tabs to hold the trays in one of the first or second positions;
wherein the rib flexes the tab as each tray is pivoted between the first and second positions;
wherein the edge of each tray includes two rounded surfaces and two ribs, and wherein the groove plate includes two flexible tabs for each tray;
wherein the rounded surfaces of the edges each have a convexly rounded profile, and wherein the tabs each have a concavely rounded profile for receiving the convexly rounded profile of the respective edges;
wherein the tabs positioned adjacent to each tray extend parallel to a direction of extension of the edge of each respective tray; and
wherein the trays are positioned on a first side of the groove plate, and wherein the tabs positioned adjacent to each tray flex away from the first side toward an opposite side of the groove plate.

26. A fiber tray apparatus comprising:
a tray, the tray having a cable management feature, including at least one of: a splice holder, a radius limiter, a slack storage area, and a fiber retention tab, the tray pivotally mountable to a groove plate; the tray pivotally movable relative to the groove plate between a first position and a second position;
wherein an edge of the tray includes a rounded surface and a rib;
wherein the rib engages a flexible tab of the groove plate to hold the tray in one of the first or second positions;
wherein the rib flexes the tab as the tray is pivoted between the first and second positions;
wherein the edge of the tray has a convexly rounded profile, and wherein the tab has a concavely rounded profile for receiving the convexly rounded profile of the edge; and
wherein the edge of the tray includes two rounded surfaces and two ribs, and wherein the groove plate includes two flexible tabs.

* * * * *